United States Patent [19]

Puttaert

[11] Patent Number: 5,536,284
[45] Date of Patent: Jul. 16, 1996

[54] FILTER FOR FILTERING GASES LADEN WITH PARTICLES

[75] Inventor: Emiel Puttaert, Sint-Niklaas, Belgium

[73] Assignee: Seghers Engineering N.V., Belgium

[21] Appl. No.: 379,508

[22] PCT Filed: Aug. 3, 1993

[86] PCT No.: PCT/BE93/00052

§ 371 Date: Feb. 1, 1995

§ 102(e) Date: Feb. 1, 1995

[87] PCT Pub. No.: WO94/03260

PCT Pub. Date: Feb. 17, 1994

[30] Foreign Application Priority Data

Aug. 5, 1992 [BE] Belgium ................ 9200701

[51] Int. Cl.[6] .................................................. B01D 29/66
[52] U.S. Cl. .......................... 55/302; 55/341.6; 55/350.1; 55/394; 55/430; 95/280
[58] Field of Search ........................... 55/343, 344, 410, 55/413, 302, 394, 350.1, 431, 430, 284, 341.1, 341.6; 95/279, 280

[56] References Cited

U.S. PATENT DOCUMENTS

| 4,525,184 | 6/1985 | Tassicker | 55/350.1 X |
|---|---|---|---|
| 4,671,806 | 6/1987 | Stil et al. | 55/431 X |
| 4,765,809 | 8/1988 | Reichel et al. | 55/410 X |

FOREIGN PATENT DOCUMENTS

| 0253273 | 1/1988 | European Pat. Off. . |
|---|---|---|
| 0402032 | 12/1990 | European Pat. Off. . |
| 0482396 | 4/1992 | European Pat. Off. . |
| 2155354 | 9/1985 | United Kingdom . |
| 2200857 | 8/1988 | United Kingdom . |

*Primary Examiner*—Richard L. Chiesa
*Attorney, Agent, or Firm*—Ladas & Parry

[57] ABSTRACT

A filter for continuous, industrial-scale filtering of gases charged with solid particles which includes a cylindrical filter body having at least one filtering section divided into an inlet chamber and an outlet chamber by a funnel-shaped separation wall with annular steps, multiple tube filters being fitted in holes provided therefor in the horizontal sections of the separation wall. All parts are positioned substantially symmetrically in a concentric, radial manner with respect to the vertical axis of the cylindrical filter body sidewall. This symmetrical, concentric, radial arrangement enables the filter to operate without any problems at temperatures of 900° C.

15 Claims, 3 Drawing Sheets

FILTER FOR FILTERING GASES LADEN WITH PARTICLES

BACKGROUND OF THE INVENTION

1. Field of the Invention

This invention relates to a filter for the continuous industrial-scale filtration of gases laden with solid particles.

2. Description of the Related Art

Existing industrial filters which are intended for the filtration of gases laden with solid particles with sufficient gas flow rate and sufficiently good retention efficiency are limited as regards the maximum service temperature. The maximum service temperature is approximately 330° C. for an electrostatic filter and approximately 180° C. for a cloth filter.

Existing industrial dust filters do not allow filtration at very high temperatures of gases which contain chemically aggressive substances such as the oxides of sulphur, chlorine and other constituents.

Moreover, tubular porous filtering elements which may, especially, serve to remove dust from hot gases are known. Such "multiple tube filters" as described, for example, in the document EP-A-0,317,190 per se withstand high temperatures (even up to 1600° C. or more).

Hitherto, the use of these multiple tube filters was limited, on the one hand, to relatively small filters which are intended for laboratory filtration and incorporate only a limited number of multiple tube filters (and which are therefore suitable only for quite low gas flow rates) and, on the other hand, to larger filters for the industrial-scale filtration of gases (with higher gas flow rates), but these larger filters only withstand temperatures which do not exceed 450° C.

To date, there is no device in existence which is sufficiently thermally stable and allows the industrial-scale filtration of gases at high temperatures, for example from 500° to 900° C.

The production of an industrial gas filter for high gas flow rates which can withstand such high temperatures creates serious problems originating, especially, in the expansion tensions which it is difficult to avoid in the presence of significant variations in temperature.

These problems are further complicated if the filter is to be used for the high-temperature filtration of gases containing chemically aggressive substances (such as hot flue gases which contain chlorine, sulphur and fluorine).

Hitherto, no satisfactory solution to these problems has been provided.

In various industrial processes, the filtration of gases laden with solid particles at high temperature could, however, be very useful and beneficial.

This is especially the case for eliminating from hot flue gases the substances which could damage the environment by polluting the atmosphere. The filtration of hot gases may also make it possible to recover precious substances, such as precious metals, in processes which are carried out at high temperature.

It should be pointed out that the cooling of hot gases laden with particles, before filtration thereof, does not always constitute a satisfactory or beneficial solution.

One of the reasons for this is that condensation products and even new products which are undesirable may form in some cases upon the cooling of hot gases laden with particles.

Unacceptable amounts of energy may also be lost during cooling processes.

SUMMARY OF THE INVENTION

The object of the invention is to produce a filter for the continuous industrial-scale filtration of gases laden with solid particles. In particular, the invention intends to provide a filter of this sort which is suitable for high operating temperatures of more than 500° C., for example, and ones which may even reach 900° C. or more.

Another object of the invention is to produce a filter of this sort which is suitable for the filtration, at such high temperatures, of gases laden with solid particles, such as flue gases which contain sulphurous compounds, chlorine, fluorine, or other chemically aggressive substances.

The subject of the invention is a filter for the continuous industrial-scale filtration of gases laden with solid particles, which filter is composed of a filter body which contains at least one filtering section comprising a space which is divided into an inlet chamber and an outlet chamber by means of a separation wall into which are fitted multiple tube filters which are closed at one end, the exterior surface and the closed end of the multiple tube filters being located in the inlet chamber, and the interior of the multiple tube filters ending in the outlet chamber, the inlet chamber being equipped with at least one inlet for the gases to be filtered and with at least one outlet for the particles separated off by filtration, and the outlet chamber being equipped with at least one outlet for the filtered gases.

In the filter in accordance with the invention, the body of the filter has an essentially cylindrical sidewall with a vertical axis. Each filtering section is delimited at the bottom by a funnel-shaped wall, the downwardly-oriented narrow part of which is connected to a means for evacuating the particles separated off by filtration. The body of the filter as well as the walls, the separation wall and the multiple tube filters of each filtering section are composed of refractory substances and are arranged so that they are radial, concentric and essentially symmetric relative to the vertical axis of the cylindrical sidewall of the body of the filter. The separation wall of each filtering section is composed of a structure which diminishes downwards and has annular steps, the inlet chamber and the outlet chamber of the filtering section being located respectively below and above this separation wall and the multiple tube filters being fitted essentially vertically into holes provided in the horizontal parts of the annular steps.

According to an advantageous embodiment, the body of the filter is thermally insulated.

The body of the filter bears on at least three supports which are joined together and one of which is joined fixedly to the body of the filter, whereas the others are equipped with a horizontal roller bearing such that the axis of each roller is placed perpendicularly to a straight line pointing towards the-fixed support.

According to an advantageous embodiment, each filtering section comprises at least two reinforcing ribs placed radially and which are joined to the sidewall of the body of the filter and support the separation wall of the filtering section.

The body of the filter and the structures which it contains may also be equipped with other ribs or reinforcing elements, the important thing being that all these elements are placed radially, concentrically and above all symmetrically relative to the vertical axis of the body of the filter and allow the whole of the structure some thermal expansion without unacceptable expansion tensions arising in the filter, even upon significant temperature variations (for example between 0° C. and 900° C.).

In each filtering section, at least one distribution wall is placed preferably between the multiple tube filters and the inlet for the gases to be filtered.

During the service life of the filter, the multiple tube filters must be cleaned regularly to minimize the pressure drop. This is the reason for which the outlet chamber of each filtering section is equipped with at least one compressed-air distribution system equipped with means which are intended periodically to blow a stream of compressed air inside at least some of the multiple tube filters and intended thus to eliminate the filtered particles from the exterior surface of the multiple tube filters.

According to an advantageous embodiment, each filtering section is equipped with at least two (for example, three, four of more) compressed-air distribution systems which are each equipped with means intended periodically, and each in turn, to blow a flow of compressed air inside some of the multiple tube filters and intended thus to eliminate the filtered particles from the exterior surface of the multiple tube filters.

The compressed-air distribution systems are composed of concentric pipes which are fixed to the sidewall of the body of the filter by fastening means fitted radially.

According to a particular embodiment, the outlet for the filtered-off particles is an evacuation pipe which emerges in a tank preferably containing a cooler.

This tank is equipped with means which are intended to eliminate the filtered-off particles from the tank and to maintain the level of these particles in the tank such that the evacuation pipe which emerges in the tank remains blocked by the filtered-off particles.

The elements of the filter which are in contact with the gases to be filtered or filtered gases or with the filtered-off particles must of course be refractory, at least up to the operating temperature of the filter. According to a particular embodiment, the filter withstands temperatures of 900° C.

According to a preferred embodiment, all the elements of the filter which are in contact with the gases to be filtered or filtered gases or with the filtered-off particles chemically withstand flue gases which contain chemically aggressive substances such as chlorine, sulphurous compounds and other constituents of this sort, up to 900° C.

According to an advantageous embodiment, the body of the filter contains at least two filtering sections which are placed one on top of another.

According to a particular embodiment of a filter of this sort with two filtering sections or more, the outlet for the filtered gases of each filtering section, with the exception of the upper section, is an annular chamber which, in the bottom, is in open communication with the outlet chamber of the filtering section immediately below and which is laterally delimited by the cylindrical sidewall of the body of the filter and by a concentric cylindrical sidewall of the inlet chamber of the filtering section immediately above and which is delimited, at the top, by the horizontal part of the upper annular step of the separation wall of the filtering section immediately above, openings being made in this horizontal part to allow the annular chamber to be in communication with the outlet chamber of the filtering section above.

According to a particular embodiment of such a filter with two filtering sections or more, the means for evacuating the filtered-off particles from each filtering section, with the exception of the lower section, is a vertical evacuation pipe joined to the narrow part of the lower funnel-shaped wall of the filtering section and placed concentrically inside the evacuation pipe of the filtering section immediately below.

Other particular features and advantages of the invention will emerge from the following description of one particular embodiment, with reference to the appended figures.

DESCRIPTION OF THE PREFERRED EMBODIMENTS

Figure 1:
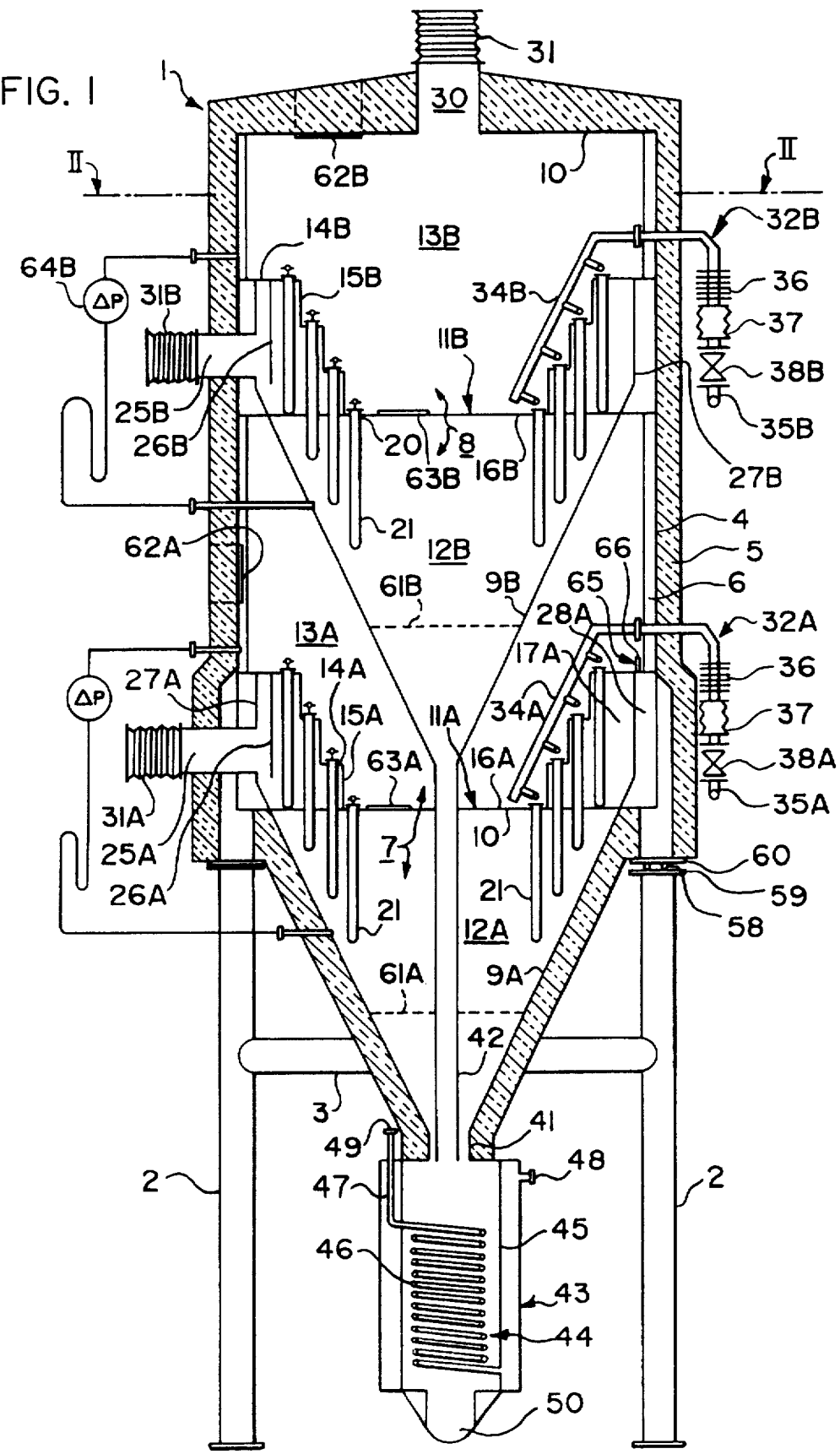
FIG. 1 is a diagrammatic view in vertical section of a filter in accordance with the invention; this view shows details which, in actual fact, are not oriented in the plane of the section.
Figure 2:
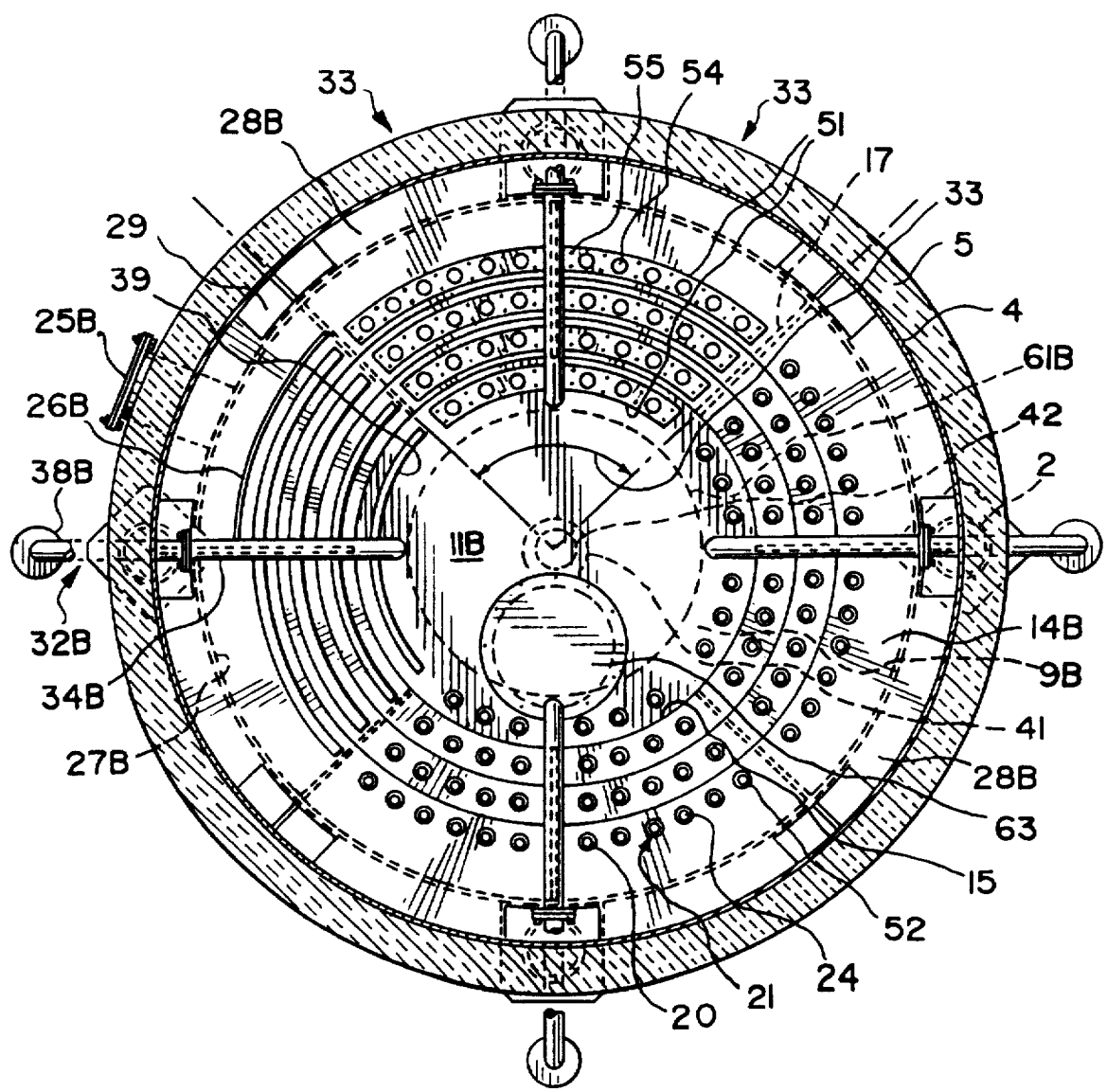
FIG. 2 is a horizontal section on II—II of FIG. 1 which shows, in the various segments, various superposed details.

The filter represented in FIGS. 1 and 2 is composed of a filter body 1 placed on supports 2 which are joined together by means of connecting bars 3.

The body of the filter 1 has a cylindrical sidewall 4 and is mounted vertically and concentrically relative to a central axis. The concentric construction of the filter allows the expansion of the materials following high temperatures in the direction of their normal axis without tensions occurring. The sidewall 4 is equipped with thermal insulation 5. That allows the gases to retain their temperature inside the filter, which is important because that prevents the formation of cooler zones and allows the formation of products of condensation and of thermal tensions to be avoided while retaining the heat of the hot gases and fully recovering it downstream.

Radial reinforcements 6 are placed against the cylindrical sidewall 4 in the body of the filter 1.

The body of the filter 1 comprises two filtering sections 7, 8 which are superposed. Each filtering section is delimited at the bottom by a funnel-shaped wall 9A, 9B. The lower filtering section 7 is delimited at the top by the funnel-shaped wall 9B which at the bottom delimits the upper filtering section 8. The upper filtering section 8 is delimited at the top by a flat wall 10.

Each filtering section 7, 8 is divided into an inlet chamber 12A,12B and an outlet chamber 13A, 13B by a separation wall 11A, 11B. The separation wall 11A,11B mainly has the shape of an inverted truncated cone which is made in the form of steps and therefore composed of flat rings 14A, 14B and cylindrical rings 15A,15B in succession, joined together. The lower part of this stepped structure which diminishes downwards is a flat and round disc 16A,16B.

The annular steps of the separation wall 11A, 11B are supported by reinforcing ribs 17A, 17B which are fixed radially onto the sidewall 4 of the body of the filter 1.

The flat rings 14A,14B and the flat round disc 16A, 16B of the separation wall 11A,11B are equipped with openings 20 into which are placed multiple tube filters 21 hanging vertically downwards, the upper surface 22 and the closed end 23 of the multiple tube filters being located in the inlet chamber 12A,12B, and the interior 24 of the multiple tube filters 21 emerging in the outlet chamber 13A, 13B.

The multiple tube filters 21 are distributed in concentric patterns above horizontal parts of the separation wall 11A, 11B. The way in which the multiple tube filters 21 are fastened will be described in detail later with reference to FIG. 3.

The inlet chamber 12A,12B of each filtering section 7 and 8 is equipped with a lateral inlet 25A,25B for the gases to be filtered.

A distribution wall 26A,26B fastened to the lower face of the separation wall 11A,11B is provided between the lateral inlet 25A,25B and to the multiple tube filters 21.

FIGS. 1 and 2 show that the sidewall of the outlet chamber 13A, 13B coincides with the cylindrical sidewall 4 of the body of the filter 1. The cylindrical sidewall 27A, 27B of the inlet chamber 12A,12B has a smaller diameter than the cylindrical sidewall 4 of the body of the filter 1. An annular chamber 28A, 28B is located between the sidewall 27A,27B of the inlet chamber 12A,12B and the sidewall of the body of the filter 1.

The annular chamber 28A which is delimited on the side situated towards the axis of the cylinder by the cylindrical sidewall 27A of the inlet chamber 12A of the lower filtering section 7, is completely closed with the exception of an equilibrium opening 65 and is therefore not in communication with the inlet chamber 12A or the outlet chamber 13A of the lower filtering section 7.

Figure 5:
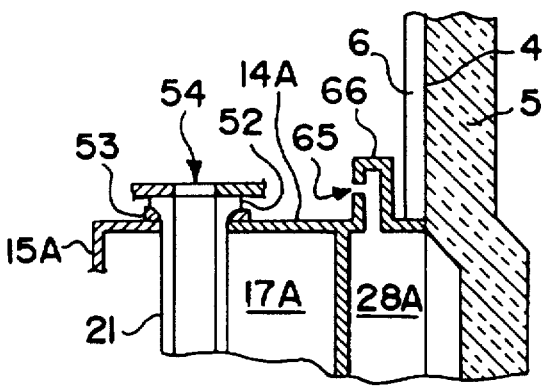
FIG. 5 is a detail of an equilibrium opening.

At least one equilibrium opening 65 towards the outlet chamber 13A of the lower filtering section 7 is provided per segment 33 in this annular chamber 28A by installing a duct 66 placed vertically and closed at the top on the upper flat horizontal ring 14A of the separation wall 11A of the lower filtering section 7. The equilibrium opening 65 which is visible in more detail in FIG. 5 ensures equilibrium of the pressures inside and outside the chamber 28A regardless of the temperature variations.

In contrast, the annular chamber 28B delimited on the side situated towards the axis of the cylinder by the cylindrical sidewall 27B of the inlet chamber 12B of the upper filtering section 8 is, for its part, in communication at the bottom with the outlet chamber 13A of the lower filtering section 7 and is delimited at the top by the upper flat ring 14B of the separation wall 11B of the upper filtering section 8. Openings 29 are provided in this flat ring 14B, which allows the annular chamber 28B to be in communication with the outlet chamber 13B of the upper filtering section 8.

The outlet of the outlet chamber 13B of the upper filtering section 8 is a central outflow opening 30.

The lateral inlets 25A,25B and the central outflow opening 30 are provided with compensators 31A,31B to allow free thermal expansion of the filter.

The multiple tube filters 21 are cleaned by blowing compressed air in the opposite direction from inside 24 the multiple tube filters 21. A compressed-air distribution system 32A, 32B is used for this purpose. Each filtering section 7,8 is divided into four segments 33 each of which is supplied by a compressed-air supply line 34A, 34B. The compressed-air supply lines 34A,34B of the various segments 33 of a filtering section 7,8 are fitted radially and joined to a cold circular duct 35A,35B. The cooling fins and compensators 37 required for this purpose are provided on the compressed-air supply lines 34A, 34B. Each segment 33 is swept separately by an automatic cold valve 38A,38B. The multiple tube filters 21 are swept per filtering section and per segment.

FIG. 2 represents a view from above of a com- pressed-air distribution system 32B in a segment 33 of the upper filtering section 8.

Figure 3:
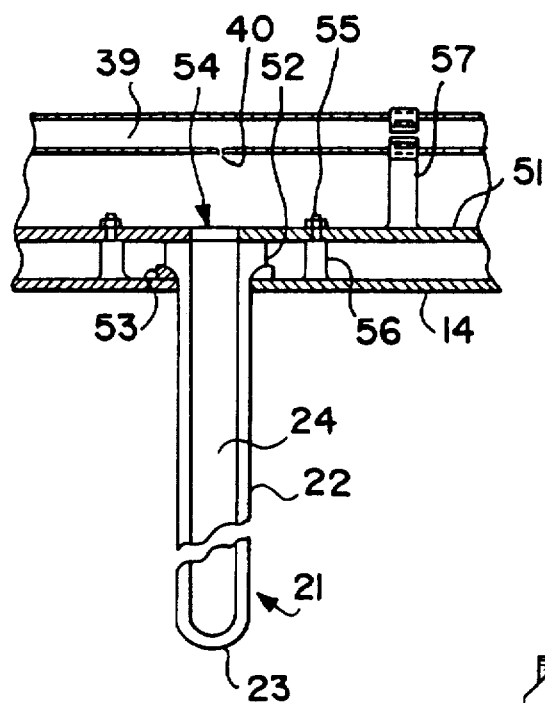
FIG. 3 is a detail of the way in which a multiple tube filter and a compressed air line are fastened.

FIGS. 1 to 3 show that the compressed air is conveyed above the multiple tube filters 21 with the aid of concentric tubes 39 which are fastened to the sidewall 4 of the body of the filter 1 by fastening means fitted radially. Below these tubes 39, a calibrated hole 40 through which the compressed air is blown vertically downwards is provided centrally above the evacuation opening of the multiple tube filters 21. By virtue of the radial concentric construction, the calibrated holes 40 remain in a correct position above the axis of the multiple tube filters 21 in the event of a rise in temperature up to the service temperature.

The filtered-off solid particles (for example fly ash) which are eliminated from the exterior surface of the multiple tube filters 21 fall into the conical funnels 9A,9B. The outlets for these solid particles are the evacuation pipes 41,42 whose axes coincide. The evacuation pipe 41 of the lower filtering section 7 has a larger diameter than the evacuation pipe 42 of the upper filtering section 8 and is located around this evacuation pipe 42 of the upper filtering section 8.

At the bottom, all the evacuation pipes 41,42 emerge in a closed tank 43 with a built-in cooler 44. The minimum level of filtered-off particles in this tank 43 ensures sealing between the various filtering sections inside the filter, and the outside.

The cooler 44 is composed, on the one hand, of a double wall 45 and, on the other hand, of a pipe 46 wound as a coil with an outlet pipe 47 for the heated-up air. The cold air penetrates through the inlet 48 at the top of the double wall 45 and then moves downwards through the coiled pipe 46 and into the outlet pipe in order then to allow the heated-up air to escape via the outlet 49 at the top of the tank 43.

A conveyor screw 50 (which is not represented in detail) is provided in the bottom of the cooler 44 in order to evacuate the filtered-off particles. This conveyor screw 50 is driven by detection of the height of particles in the tank 43 above the cooler 44 so as to guarantee a minimum level.

When the filter is started up, the tank 43 is filled with sand up to the minimum level in order to obtain sealing between the various filtering sections of the filter and relative to the outside of the latter.

FIGS. 2 and 3 show how the multiple tube filters 21 are fastened onto the horizontal parts 14A,14B of the annular steps with the aid of pressure plates 51 in the form of segments. The multiple tube filters 21 are equipped, at the top, with a collar 52 which is compressed between the horizontal part 14 and the segment-shaped pressure plate 51, refractory packing rings 53 being interposed. Holes 54, the diameter of which corresponds to that of the evacuation opening of the multiple tube filters 21 are provided in the segment-shaped pressure plates 51. The segment-shaped pressure plates 51 are fastened to the horizontal parts 14A,14B of the steps with the aid of bolts 55. A limit stop 56 is intended for each connection bolt 55 to avoid the collar 52 of the multiple tube filter 21 becoming damaged by overtightening the bolts 55.

FIG. 2 represents a view from above of the pressure plates 51 and of the bolts 55 in a segment of the filtering section 8.

FIG. 3 also shows a support element 57 which is welded at the bottom onto the pressure plate 51 and makes it possible to keep the concentric tube 39 in the right place.

All of the elements of the filter which come into contact with the hot gases or the hot solid particles are made from stainless steel which withstands high temperatures (with the exception of the multiple tube filters 21 which are composed of porous ceramic fibres).

The stainless steel used also withstands chlorine, fluorine or sulphurous compounds which may be found in the gases to be filtered (for example, in the hot flue gases).

Figure 4:
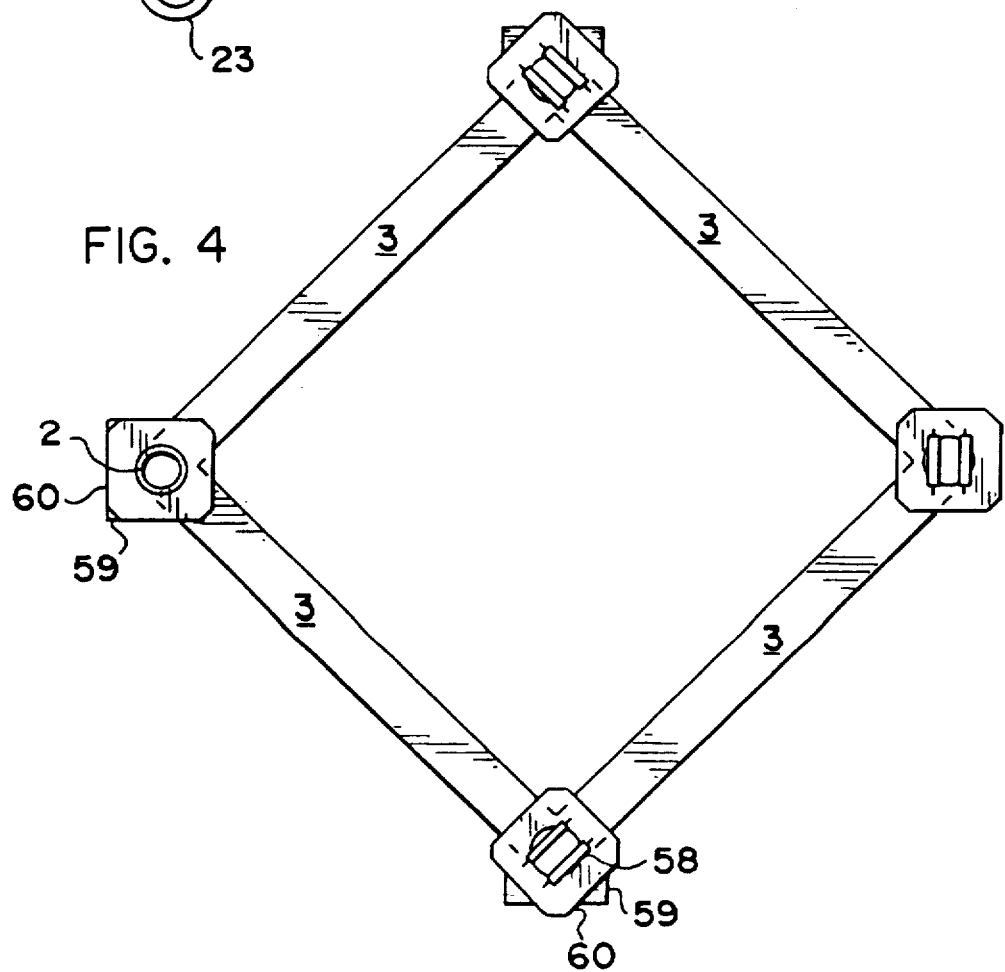
FIG. 4 is a representation of the connection between the supports and of the orientation of the roller bearings relative to the fixed support.

FIG. 4 represents the supports 2 and their connecting bars 3. The body of the filter 1 rests on four supports 2 joined together by four connecting bars 3. One support 2 is fixedly joined to the body of the filter 1, whereas the others are equipped with a roller bearing 58 to allow free expansion of the body of the filter 1. The supports 2 are joined together so as to absorb the friction forces of the roller bearings 58. In order to do this, the supports 2 are interrupted, above the connecting bars 3, by horizontal plates 59,60 between which the bearings 58 are located. Each horizontal roller bearing 58 is configured such that the axis of each roller is placed perpendicularly to a straight line pointing towards the fixed support 2.

The filter in accordance with the invention is particularly suited to eliminating fly ash from hot flue gases.

As FIG. 1 shows, the gases laden with solid particles are distributed, before entering the filter, and sent towards the inlet 27A,27B of the two filtering sections 7,8 where they are distributed over the multiple tube filters 21 by a distribution wall 26A,26B.

The gases laden with solid particles pass across the exterior surface 22 of the multiple tube filters 21 on which the particles are retained. The filtered gas passes via the interior 24 of the multiple tube filters 21 to pass towards the outlet chamber 13A,13B of the filtering section 7,8 in question. The filtered gas from the lower filtering section 7 leaves this filtering section 7 passing through the annular chamber 28B and passes towards the outlet chamber 13B of the upper filtering section 8. The filtered gases from the two filtering sections 7,8 leave the filter together, passing via the central outflow opening 30 in the upper filtering section 8.

As the multiple tube filters 21 retain hot particles, the pressure difference between each inlet chamber 12A,12B and the corresponding outlet chamber 13A,13B will increase progressively. Measuring apparatus 64A, 64B is provided in order to measure this pressure difference. Given that the multiple tube filters 21 are crossed in sections, in parallel, soiling will be uniform over these multiple tube filters 21.

By virtue of a timer which operates the compressed air valve 38A,38B, per segment, the multiple tube filters 21 are cleaned at regular intervals by blowing compressed air therein in the opposite direction. The conveying of the gases laden with solid particles towards the filter need not be halted.

The compressed air is sent into the multiple tube filters 21 per segment and per filtering section 7,8 during a fraction of a second by means of the compressed-air distribution systems 32A, 32B. In this way, all the multiple tube filters 21 are swept one after another, that is to say filtering section by filtering section and segment by segment.

Regularly, but above all during cleaning, the hot particles from the exterior surface 22 of the multiple tube filters 21 fall to the bottom where they are recovered in the lower funnel-shaped wall 9A, 9B which constitutes the lower face of each filtering section 7,8. A flat steel grating 61A, 61B equipped with wide square openings is provided in each funnel 9A,9B in order to gather any multiple tube filters 21 which may have broken. This grating 61A, 61B also acts as a floor for carrying out an inspection or maintenance work.

The particles slide to the bottom along the lower funnel-shaped wall 9A, 9B. The particles coming from the upper filtering section 8 fall to the bottom, passing through the central evacuation pipe 42. The particles coming from the lower filtering section 7 fall to the bottom into the tank 43, passing through the concentric evacuation pipe 41 situated around the evacuation pipe 42 of the upper filtering section 8.

Maintenance of the filter is limited to the replacement of soiled and/or broken multiple tube filters 21.

An access hatch 62A, 62B is provided, for each filtering section 7,8, in the sidewall 4 of the body of the filter 1 in order to gain access to the outlet chamber 13A of the lower filtering section 7, and in the flat upper wall 10 in order to gain access to the outlet chamber 13B of the upper filtering section 8, for maintenance work on these filtering sections 7,8. A hatch 63A, 63B used to reach each inlet chamber 12A, 12B from the corresponding outlet chamber 13A,13B is located at the lower part of the step-shaped cones 11, in the flat round disc 16A,16B.

By virtue of the specific construction, this filter can be used for a wide range of gas flow rates and particle concentrations.

By altering the diameter of the body of the filter 1, and the number of multiple tube filters 21 per filtering section 7,8, the number of filtering sections per filter body 1, and the number of filter bodies 1, the filter can be adapted to the characteristics of the gases laden with particles, that is to say to the incoming flow rate and dust concentration.

What is claimed is:

1. A filter for the continuous industrial-scale filtration at temperatures of at least 500° C. of flue gases laden with solid particles, said filter comprising a filter body which contains at least one filtering section comprising a space which is divided into an inlet chamber and an outlet chamber by means of a separation wall into which are fitted multiple tube filters which are closed at one end, the exterior surface and the closed end of the multiple tube filters being located in the inlet chamber, and the interior of the multiple tube filters ending in the outlet chamber, the inlet chamber being equipped with at least one inlet for the gases to be filtered and with at least one outlet for the particles separated off by filtration, and the outlet chamber being equipped with at least one outlet for the filtered gases; in which the body of the filter has a substantially cylindrical sidewall with a vertical axis, and in which each filtering section is delimited at the bottom by a funnel-shaped evacuation wall, the downwardly-oriented narrow part of which is connected to a means for evacuating the particles separated off by filtration, and in which the body of the filter as well as the internal walls, and the multiple tube filters of each filtering section comprise refractory substances and are arranged so that they are radial or concentric and substantially symmetric relative to the vertical axis of the cylindrical sidewall of the body of the filter wherein the separation wall of each filtering section comprises a structure which narrows in a downward direction and has annular steps, the inlet chamber and the outlet chamber of the filtering section being located respectively below and above this separation wall, the inlet chamber of each section being thus delimited at the bottom by the funnel-shaped evacuation wall and at the top by the separation wall, the one or more inlets for the gases to be filtered being situated in the wide part of the inlet-chamber, the multiple tube filters being fitted substantially vertically into holes provided in the horizontal parts of the annular steps, each filtering section comprising at least two reinforcing ribs supporting the annular steps of the separation wall and which are joined in radial direction to the sidewall of the body of the filter, all of the elements of the filter coming into contact with the flue gases or the solid particles, with the exception of the multiple tube filters, being made from stainless steel withstanding the operating temperature of the filter and the cylindrical sidewall of the body of the filter being thermally insulated on the outside.

2. The filter according to claim 1, wherein the body of the filter bears on at least three supports which are joined together and one of which is joined fixedly to the body of the filter, whereas the others are equipped with a horizontal roller bearing such that the axis of each roller is placed perpendicularly to a straight line pointing towards the fixed support.

3. The filter according to claim 1, wherein at least one distribution wall is placed in each filtering section between the multiple tube filters and the inlet for the gases to be filtered.

4. The filter according to claim 1, wherein the outlet chamber of each filtering section is equipped with at least one compressed-air distribution system equipped with means for periodically blowing a stream of compressed air inside at least some of the multiple tube filters to eliminate the filtered particles from the exterior surface of the multiple tube filters.

5. The filter according to claim 4, wherein the outlet chamber of each filtering section is equipped with at least two compressed-air distribution systems which are equipped with means for periodically, and each in turn, blowing a stream of compressed air inside some of the multiple tube filters to eliminate the filtered particles from the exterior surface of these multiple tube filters.

6. The filter according to claim 5, wherein the compressed-air distribution systems comprise concentric pipes which are fixed to the sidewall of the body of the filter by fastening means fitted radially.

7. The filter according to claim 1, wherein the outlet for the filtered-off particles is an evacuation pipe which emerges in a tank.

8. The filter according to claim 7, wherein the tank contains a cooler.

9. The filter according to claim 7, wherein the tank is equipped with means for eliminating the filtered-off particles from the tank and for maintaining the level of these particles in the tank such that the evacuation pipe which emerges in the tank remains blocked by the filtered-off particles.

10. The filter according to claim 1, wherein all of its elements which are in contact with the gases to be filtered, or filtered gases or with the filtered-off particles withstand temperatures of 900° C.

11. The filter according to claim 1, wherein all of its elements which are in contact with gases to be filtered or filtered gases or with the filtered-off particles, chemically withstand flue gases containing sulphurous and/or chlorine-containing compounds up to 900° C.

12. The filter according to claim 1, wherein the body of the filter contains at least two superposed filtering sections.

13. The filter according to claim 12, wherein the means for evacuating the filtered-off particles from each filtering section, with the exception of the lower section, is a vertical evacuation pipe, joined to the narrow part of the lower funnel-shaped wall of the filtering section and placed concentrically inside the evacuation pipe of the filtering section immediately below.

14. The filter according to claim 12, wherein the outlet for the filtered gases of each filtering section, with the exception of the upper section, is an annular chamber which, in the bottom, is in open communication with the outlet chamber of the filtering section immediately below and which is laterally delimited by the cylindrical sidewall of the body of the filter and by a concentric cylindrical sidewall of the inlet chamber of the filtering section immediately above and is delimited, at the top, by the horizontal part of the upper annular step of the separation wall of the filtering section immediately above, openings being made in this horizontal part to allow the annular chamber to be in communication with the outlet chamber of the filtering section immediately above.

15. The filter according to claim 14, wherein the means for evacuating the filtered-off particles from each filtering section, with the exception of the lower section, is a vertical evacuation pipe, joined to the narrow part of the lower funnel-shaped wall of the filtering section and placed concentrically inside the evacuation pipe of the filtering section immediately below.

* * * * *